United States Patent [19]

Cicon

[11] 4,226,297
[45] Oct. 7, 1980

[54] ACOUSTIC TREATED EXHAUST PLUG FOR TURBINE ENGINE

[75] Inventor: Dennis E. Cicon, Manchester, Conn.

[73] Assignee: United Technologies Corporation, Hartford, Conn.

[21] Appl. No.: 3,434

[22] Filed: Jan. 12, 1979

[51] Int. Cl.² ........................ F01N 1/00; G10K 11/04; F02K 1/26

[52] U.S. Cl. ........................................ 181/213; 60/262

[58] Field of Search ................ 181/213, 220, 214; 60/262, 224, 324

[56] References Cited

U.S. PATENT DOCUMENTS

| | | | |
|---|---|---|---|
| 4,064,961 | 12/1977 | Tseo | 181/213 |
| 4,100,993 | 7/1978 | Feder | 181/213 |
| 4,135,363 | 1/1979 | Packman | 181/220 |
| 4,137,992 | 2/1979 | Herman | 181/213 |
| 4,149,375 | 4/1979 | Wynosky et al. | 181/220 |

*Primary Examiner*—Stephen J. Tomsky
*Attorney, Agent, or Firm*—Norman Friedland

[57] ABSTRACT

An acoustical muffler for a turbofan engine is disclosed. The muffler is utilized on the tail cone plug and comprises a plurality of circumferentially spaced slots oriented in parallel relationship to the grazing flow (the exhaust stream of core engine and fan discharge air). The slots have depending walls extending into the hollow central portion of the plug. Barriers at the upstream and downstream ends serve to define the volume of the plug. The relationship between the slots and volume is selected to tune the muffler to the desired frequency of peak attenuation. Radial extending barriers discretely mounted within the plug help to prevent airflow into and out of the slots.

4 Claims, 3 Drawing Figures

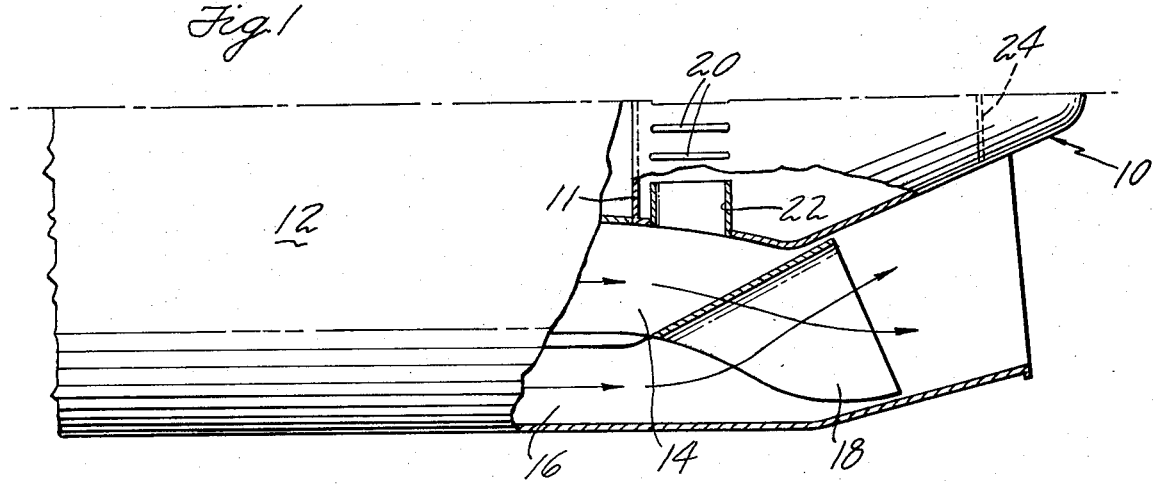
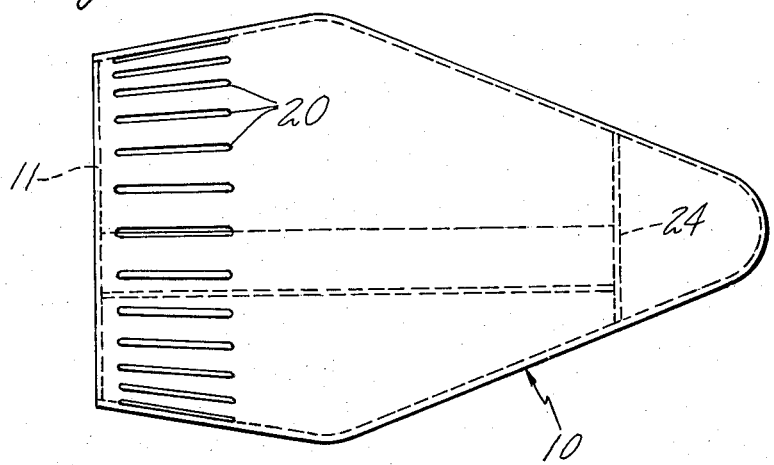
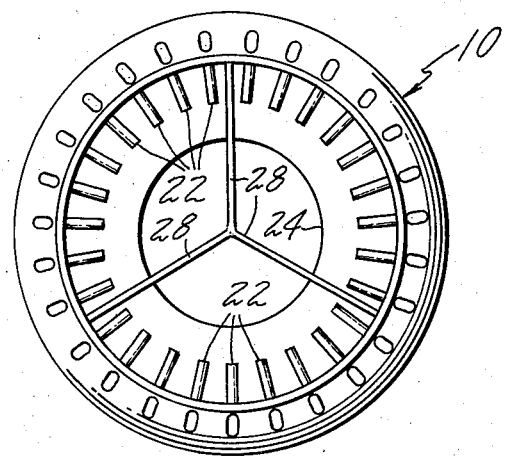

4,226,297

ACOUSTIC TREATED EXHAUST PLUG FOR TURBINE ENGINE

BACKGROUND OF THE INVENTION

This invention relates to turbofan engines and particularly to mufflers for suppressing noise and utilizing the plug cone in the engine exhaust stream.

U.S. Pat. No. 4,100,993 granted to E. Feder on July 18, 1978 entitled ACOUSTIC LINER and assigned to the same assignee as this patent application discloses a similar acoustic liner where slots are in communication with a cavity for suppressing sound. As shown therein slots having depending lips are disposed transverse to the direction of flow of the grazing flow. The slots and cooperating lips form a space or volume for supporting a column of air for obtaining a desired mass reactance.

I have found that by the proper orientation of the slots relative to the grazing flow I have unexpectedly realized at least 4—5 decibel reduction in the noise level when in the frequency range of about 400 Hertz. In the exhaust plug muffler for a jet engine to which this invention is applied, the plug is hollow, closed at both its upstream end and downstream end by barriers. Although the flow in the jet engine is essentially annular and the plug is mounted coaxially to the annular flow and in the quiescent portion, it is susceptible of seeing some flow. The flow that migrates through the slots tends to flow internally of the plug and out of other slots. Any flow into and out of the slots is deleterious to sound suppression. Thus, the plug is designed, according to this invention, to eliminate or minimize any flow into and out of the slots. To this end, baffles radiating radially from the inner diameter to the plug center line and extending the axial dimension serve to alleviate this adverse flow problem.

SUMMARY OF THE INVENTION

A feature of this invention is the improved noise suppression for a jet engine particularly noise levels in the low frequency range of 400 Hertz. A feature of this invention is to orient slots having a definitive depth formed on the engine exhaust plug parallel to the direction of its grazing flow of the exhaust stream. Another feature of the invention is the utilization of radially extending baffles centrally mounted in the plug to assure quiescence in the hollow portion of the plug.

Other features and advantages will be apparent from the specification and claims and from the accompanying drawings which illustrate an embodiment of the invention.

BRIEF DESCRIPTION OF THE DRAWINGS

FIG. 1 is a view in elevation and partly in section of a fan jet engine having a mixer surrounding the tail cone plug;

FIG. 2 is a side elevation of the tail cone plug modified to accommodate the inventive sound attenuator; and FIG. 3 is a rear view showing the arrangement of the acoustic slots and the baffle plates.

DESCRIPTION OF THE PREFERRED EMBODIMENT

As was noted above, the U.S. Pat. No. 4,100,993 supra, describes a sound attenuator that includes a deep backing cavity communicating with the grazing flow via an inlet that supports a column of air to produce a Helmholtz effect. Each cavity has a corresponding column of air and the dimension of the column of air is sized to produce the desired mass reactance. Further noted in this patent, the slots are oriented transverse to the direction of the grazing flow to minimize aerodynamic losses.

As can be seen from FIGS. 1, 2, and 3 the tail cone plug 10 is mounted in the exhaust section of the engine 12 where the primary or core air in annular passageway 14 and the fan air in annular passageway 16 are exhausted to ambient to produce thrust in a conventional manner. Plug 10 is mounted behind the hub and shaft portion of the engine so that the open end thereof is essentially in the quiescent area and the high velocity stream of the engine working medium pass directly over the plug surface. A suitable mixer 18 of the conventional convolute type may be employed to mix the fan and core engine air just prior to being discharged overboard.

According to this invention the cone plug 10 is made hollow with the base being mounted to the exhaust case behind the turbine section (not shown) extending axially and coaxial to the annular passageways 14 and 16. A plurality of circumferentially spaced slots 20 are formed on the outer skin of plug 10, each communicating internally with the inner cavity of the plug. Each slot 20 is elongated and identically sized (although the sizing may vary depending on the application) and are disposed parallel to the general direction of the flow through the exhaust case of the engine. Each slot is fitted with a hollow depending member 22 whose inner dimensions conform to the contour of the slot and extends a predetermined radial distance into the cavity of plug 10. This effectively supports a column of air and it is sized with relationship to the volume defined by the cavity of plug 10 which is established by end wall 24 and forward wall 11. The volume of the cavity of plug 10 and the volume of the supporting column of air in the inlets defined by the slots are selected to tune the muffler for the desired frequency of peak attenuation. A plurality of baffles 28 radiating radially from the inner diameter of the plug wall to the axial center line and extending axially in the plug's cavity serve to prevent the air from flowing from one slot to another. Once the cavity of the plug is filled with air, all that it sees in order to function properly is the pulsation produced by the sound waves; flow passing through the slots is deleterious to the Helmholtz effect.

Thus, since there typically is a pressure profile around the skin of plug 10, a suitable number of baffles is required to assure the quiescent state.

In actual testng of this invention which included a second row of slots mounted adjacent to and in alignment with the first row no losses in engine performance was evidenced and a reduction in the order of 4–5 decibels was realized.

It should be understood that the invention is not limited to the particular embodiments shown and described herein, but that various changes and modifications may be made without departing from the spirit and scope of this novel concept as defined by the following claims.

I claim:

1. In combination, a hollow tail cone plug mounted in the exhaust stream of a turbine type power plant, means for suppressing sound noise in the low frequency range including a plurality of elongated slots having their major axis disposed parallel to the grazing flow spaced circumferentially in the outer skin of the plug and communicating with the cavity portion of the plug, each slot having a hollow depending member extending from the slot radially inward in said cavity defining a volume for supporting a column of air, said volume and the volume of said cavity being selected to tune said suppressing means for the desired frequency of peak attenuation of the noise propagated by the grazing flow.

2. The combination as in claim 1 including baffle means extending axially in said cavity for preventing the flow from at least one slot from migrating to at least a second of said slots.

3. The combination as in claim 2 wherein said baffle means includes flat-like plate members extending radially from the inner diameter of the plug to the axial center line of said plug and extending a sufficient distance to extend over the expanse of the major axis of said slot.

4. The combination of claim 1 wherein said turbine type engine includes a fan and fan air discharge annular passageway and core engine and core engine air discharge annular passageway, a mixer disposed in said exhaust stream and surrounding said slots.

* * * * *